US011835235B1

(12) United States Patent
Strzępek

(10) Patent No.: US 11,835,235 B1
(45) Date of Patent: Dec. 5, 2023

(54) COMBUSTOR WITH HELIX AIR AND FUEL MIXING PASSAGE

(71) Applicant: Pratt & Whitney Canada Corp., Longueuil (CA)

(72) Inventor: Jakub Strzępek, Rzeszów (PL)

(73) Assignee: Pratt & Whitney Canada Corp., Québec (CA)

( * ) Notice: Subject to any disclaimer, the term of this patent is extended or adjusted under 35 U.S.C. 154(b) by 0 days.

(21) Appl. No.: 18/104,960

(22) Filed: Feb. 2, 2023

(51) Int. Cl.
*F23R 3/28* (2006.01)
*F23R 3/12* (2006.01)
*F02C 7/22* (2006.01)
*F23R 3/14* (2006.01)

(52) U.S. Cl.
CPC ............... *F23R 3/286* (2013.01); *F02C 7/22* (2013.01); *F23R 3/12* (2013.01); *F23R 3/14* (2013.01); *F05D 2220/32* (2013.01); *F05D 2240/35* (2013.01); *F05D 2240/36* (2013.01)

(58) Field of Classification Search
CPC .... F23R 3/12; F23R 3/14; F23R 3/286; F23R 2900/03282
See application file for complete search history.

(56) References Cited

U.S. PATENT DOCUMENTS

| | | | |
|---|---|---|---|
| 7,832,212 B2 | 11/2010 | Bunker | |
| 7,870,736 B2 | 1/2011 | Homitz et al. | |
| 8,266,911 B2 | 9/2012 | Evulet | |
| 8,348,180 B2 | 1/2013 | Mao et al. | |
| 8,413,445 B2 | 4/2013 | Poyyapakkam | |
| 8,539,773 B2 | 9/2013 | Ziminsky et al. | |
| 8,661,779 B2 | 3/2014 | Laster et al. | |
| 8,893,500 B2 | 11/2014 | Oskam | |
| 9,752,774 B2 | 9/2017 | Wang et al. | |
| 9,771,869 B2 | 9/2017 | Li et al. | |
| 9,976,522 B2 | 5/2018 | Patel et al. | |
| 10,082,294 B2 | 9/2018 | Laster et al. | |
| 10,228,137 B2 | 3/2019 | Kopp-Vaughan et al. | |
| 10,267,522 B2 | 4/2019 | Ciani et al. | |

(Continued)

FOREIGN PATENT DOCUMENTS

| | | |
|---|---|---|
| CN | 101220955 | 7/2008 |
| CN | 206113000 | 4/2017 |

(Continued)

*Primary Examiner* — Scott J Walthour
(74) *Attorney, Agent, or Firm* — Carlson, Gaskey & Olds, P.C.

(57) ABSTRACT

A combustor includes a combustor liner defining a combustion chamber and a fuel and air mixing body connected to the combustor liner to deliver mixed fuel and air into the combustion chamber. The mixing body includes an inner housing member centered on a center axis and an intermediate housing member. A mixing passage is defined between the inner and intermediate housing members. The mixing passage extends along a direction from an upstream end to a downstream end with a circumferential component, a component in an axially downstream direction, and a radially inward component with at least one air inlet into the mixing passage. A fuel supply extends into the mixing passage at a location downstream of the air inlet. The mixing passage extends downstream to supply fuel and air into the combustion chamber. A gas turbine engine is also disclosed.

16 Claims, 3 Drawing Sheets

(56) References Cited

U.S. PATENT DOCUMENTS

| | | |
|---|---|---|
| 10,502,425 B2 | 12/2019 | Boardman et al. |
| 10,704,786 B2 | 7/2020 | Laster et al. |
| 10,865,989 B2 | 12/2020 | Sadasivuni |
| 10,941,940 B2 | 3/2021 | Bulat et al. |
| 11,067,280 B2 | 7/2021 | Boardman et al. |
| 2011/0179797 A1* | 7/2011 | Prade ................. F23R 3/14 60/776 |
| 2011/0185703 A1 | 8/2011 | Dodo et al. |
| 2012/0227411 A1 | 9/2012 | Carroni et al. |
| 2013/0327849 A1* | 12/2013 | Matsuyama ........... F23R 3/343 239/408 |
| 2017/0227224 A1 | 8/2017 | Oskam et al. |
| 2017/0307210 A1 | 10/2017 | Hirano et al. |
| 2021/0172413 A1 | 6/2021 | Snyder |

FOREIGN PATENT DOCUMENTS

| | | | |
|---|---|---|---|
| EP | 1923637 | 5/2008 | |
| GB | 2316162 A * | 2/1998 | ............ B01F 5/0057 |
| JP | 2013108667 | 6/2013 | |
| JP | 5538113 | 7/2014 | |
| JP | 5926635 | 5/2016 | |
| JP | 6181997 B2 | 8/2017 | |
| WO | 2016051756 | 4/2016 | |
| WO | 2020259919 | 12/2020 | |

\* cited by examiner

COMBUSTOR WITH HELIX AIR AND FUEL MIXING PASSAGE

BACKGROUND

This application relates to a combustor for a gas turbine engine having a generally helix passage for mixing air and fuel.

Gas turbine engines are known, and typically include a compressor delivering compressed air into a combustor. Compressed air is mixed with fuel and ignited. Products of the combustion pass downstream over turbine rotors, driving them to rotate. The turbine rotors in turn rotate the compressor rotor and propulsor rotor such as a fan or propeller.

Historically, aviation fuel has been utilized with gas turbine engines, especially for aircraft applications. More recently it has been proposed to utilize hydrogen ($H_2$) as a fuel.

SUMMARY

A combustor includes a combustor liner defining a combustion chamber and a fuel and air mixing body connected to the combustor liner to deliver mixed fuel and air into the combustion chamber. The mixing body includes an inner housing member centered on a center axis and an intermediate housing member. A mixing passage is defined between the inner and intermediate housing members. The mixing passage extends along a direction from an upstream end to a downstream end with a circumferential component, a component in an axially downstream direction, and a radially inward component with at least one air inlet into the mixing passage. A fuel supply extends into the mixing passage at a location downstream of the air inlet. The mixing passage extends downstream to supply fuel and air into the combustion chamber.

These and other features will be best understood from the following drawings and specification, the following is a brief description.

DETAILED DESCRIPTION

Figure 1:
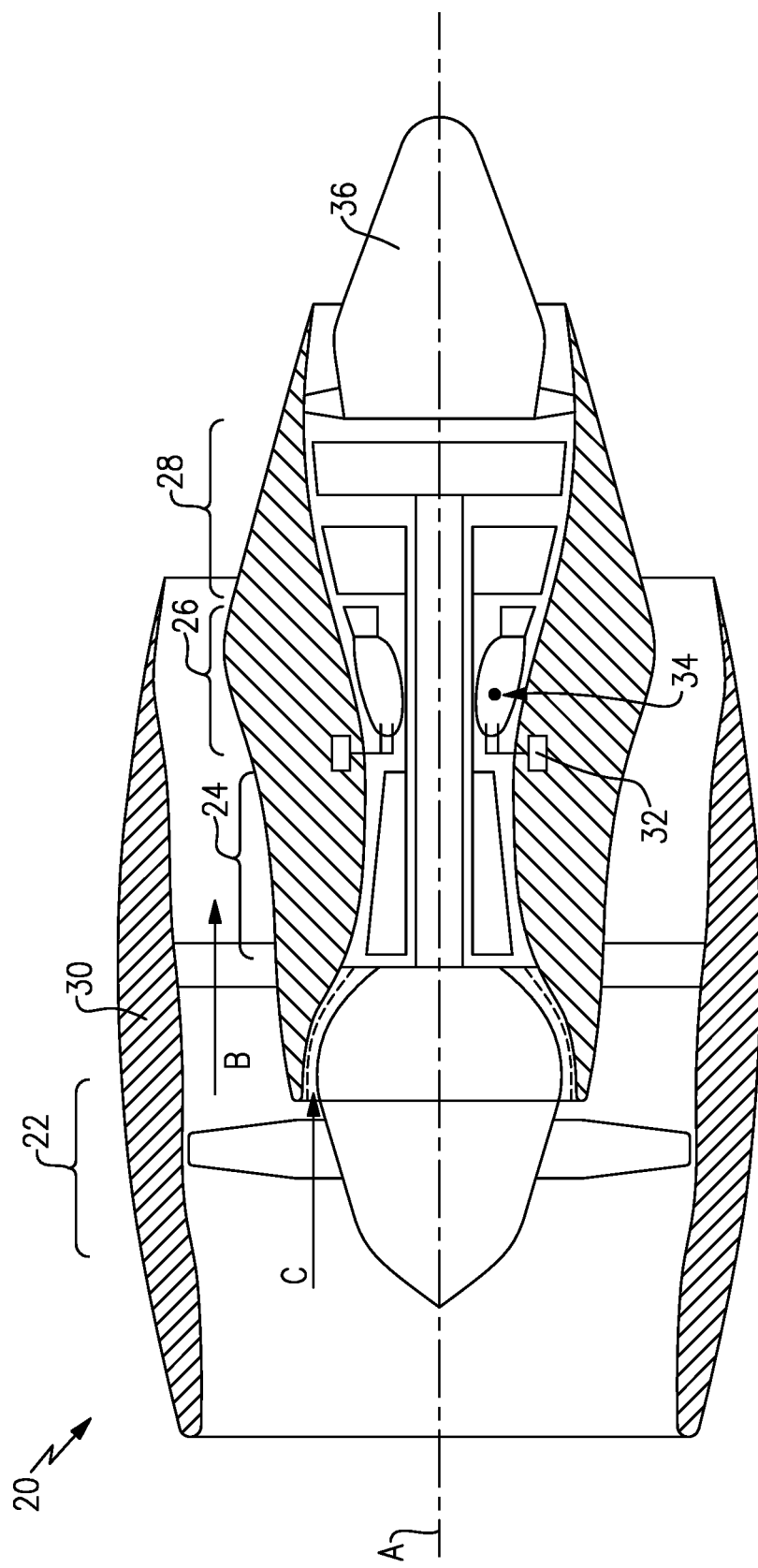
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller.

A gas turbine engine as disclosed in this application will utilize hydrogen ($H_2$) as a fuel. Challenges are faced by the use of hydrogen, and in particular combustor structure which might be appropriate for aviation fuel may not be as applicable to hydrogen as a fuel.

One challenge when utilizing hydrogen as a fuel is that it is in a gaseous state and more readily flammable than aviation fuel. This could raise challenges with burn back if ignitions starts too close to the fuel feed.

Figure 2A:
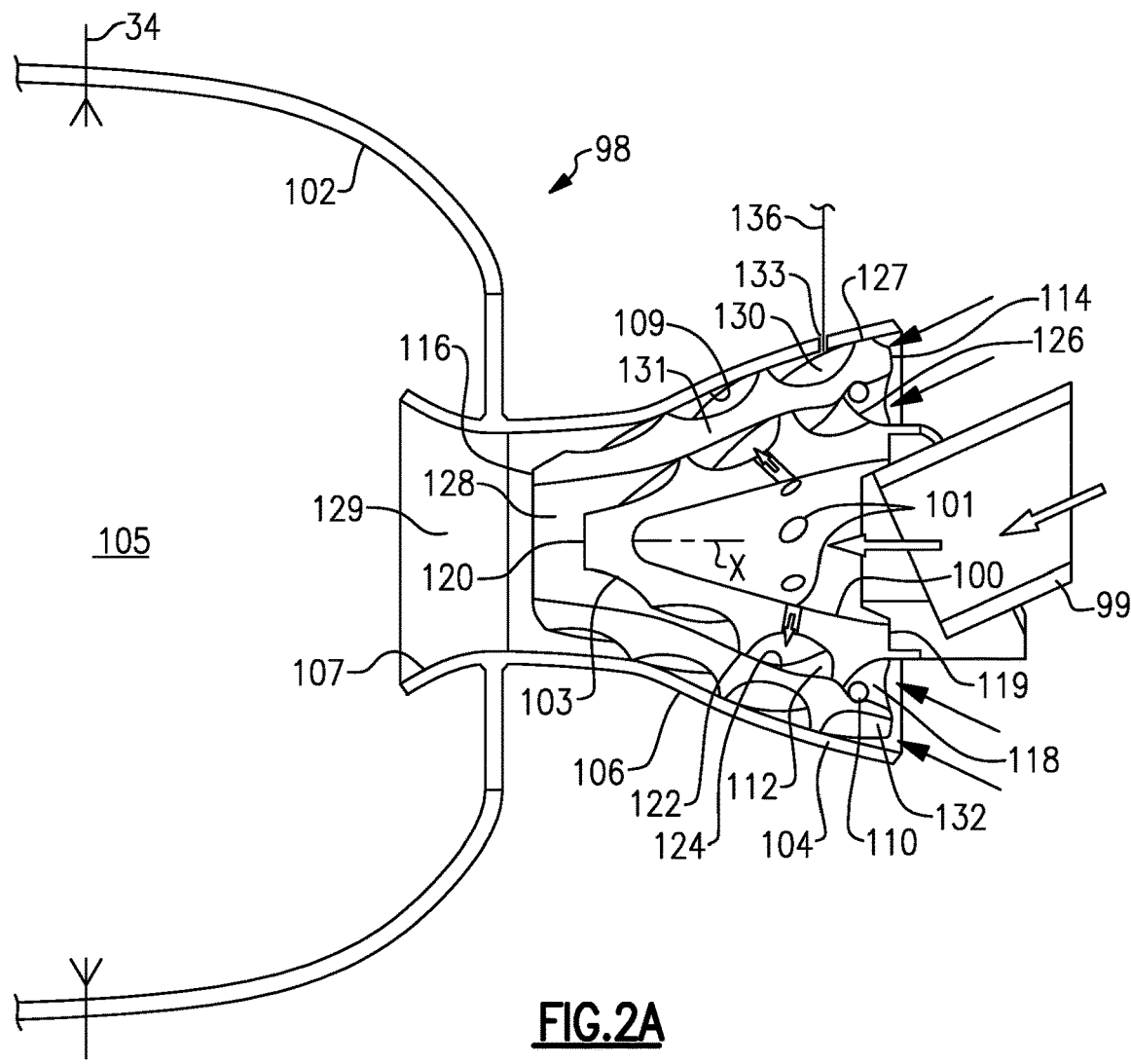
FIG. 2A shows details of a portion of a combustor body.

FIG. 2A shows a combustor embodiment 98 having a combustor liner 102 (shown partially). A fuel and air mixing body 104 is secured to combustor housing 102. A fuel supply 99 leads into an interior 100 of an inner housing member 103. Fuel supplied into the interior 100 radially passes outwardly through passages 101 into a mixing passage 112 defined between the inner housing member 103 and an intermediate housing member 131.

Rails 122 define the mixing passage 112 and contact an inner surface 124 of the intermediate housing 131. Air inlet 118 deliver air into the mixing passage 112. Air and fuel are mixed in the passage 112. The inner housing member 103 has a downstream end 120 and an upstream end 119. A diameter of the inner housing member 103 decreases from the upstream end 119 to the downstream end 120 such that the shape is generally frusto-conical.

In an embodiment there are a plurality of mixing passages 112. Mixing passages 112 could be said to extend along a helix, and extend with a component in a circumferential direction about a central axis X of the inner housing member 103, and with a component in an axially downstream direction, and radially inwardly. That is, the passages extend with a generally helix shape. Note the term "generally helix" is used to make clear that the shape need not be an exact helix; just that it extends with a circumferentially, axial and radial component. A downstream end of the mixing passages 112 opens into a chamber 128.

An outermost housing member 106 surrounds the intermediate housing member 131.

Outer passage 130 is defined between an inner surface 109 of the outer housing member 106 and an outer surface of the intermediate housing member 131. Here again, rails 127 define the outer passages 130 and contact inner surface 109. The outer passages 130 extend with a generally helix shape such that they also have a component in a circumferential direction, an axially downstream direction, and a radially inward direction relative to axis X. The intermediate housing member 131 extends from an upstream end 114 to a downstream end 116, and also decreases in a radial dimension such that it also has a generally frusto-conical shape.

The upstream end of the outer passage 130 receives air from openings 132. The air from the outer passage 130 opens at a downstream end into a chamber 129 downstream of the downstream end of the mixing passage 112 and chamber 128. This outer air provides a swirler effect to further mix the fuel and air from the mixing passage 112. The air and fuel then moves through a radially outwardly curved portion 107 of the outer housing 106, such that it moves in a swirling manner into combustion chamber 105.

It should be appreciated that the air leaving both of the generally-helix passages 112 and 130 will flow with a swirl when passing from the downstream end of the respective passages.

A lock ring 110 secures inner housing member 103 to intermediate housing member 131.

An optional fuel supply hole 133 is connected to a source 136 of fuel, and delivers fuel into the passage 130. This can provide additional fuel to be mixed with the air as it approaches the downstream end and enters the chamber 129.

Figure 2B:
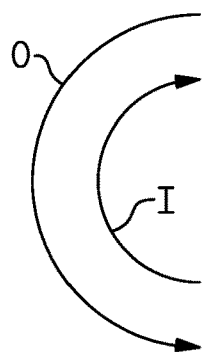
FIG. 2B shows a first embodiment flow path feature.

FIG. 2B shows a first embodiment option wherein the inner mixing passage 112 imparts a swirl in a clockwise direction while the outer passage imparts a swirl in a counterclockwise direction.

Figure 2C:
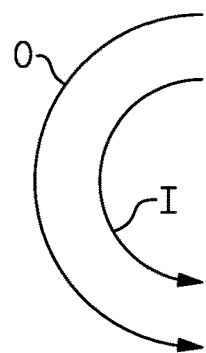
FIG. 2C shows an alternative flow path feature.

FIG. 2C shows an optional embodiment wherein both the inner and outer passages impart swirl in the same direction.

Figure 3A:
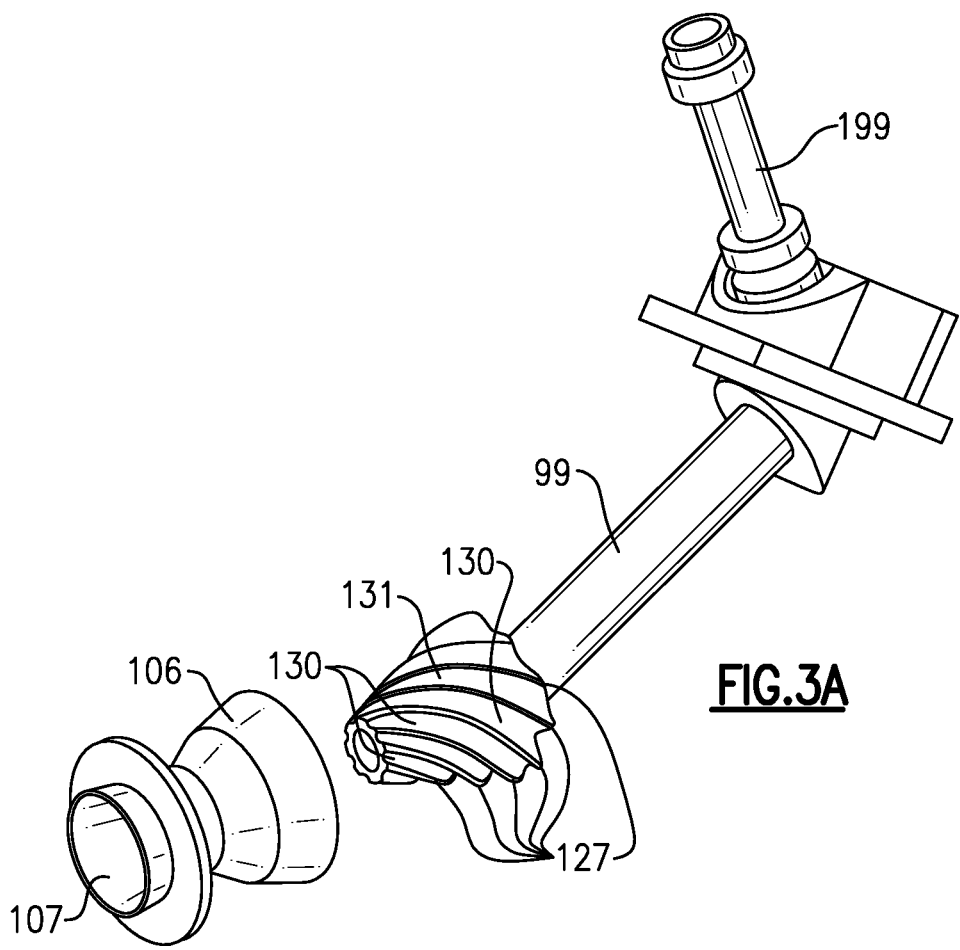
FIG. 3A shows details of the FIG. 2A embodiment.

FIG. 3A shows details including a fuel supply tube 199 leading to the supply tube 99. The intermediate housing member 131 is shown as well as the outer housing 106. As can be seen there are plural rails 127 so that plural passages 130 are formed. As can be appreciated, none of the passages 130 extend across the entire circumference of intermediate housing member 131.

Figure 3B:
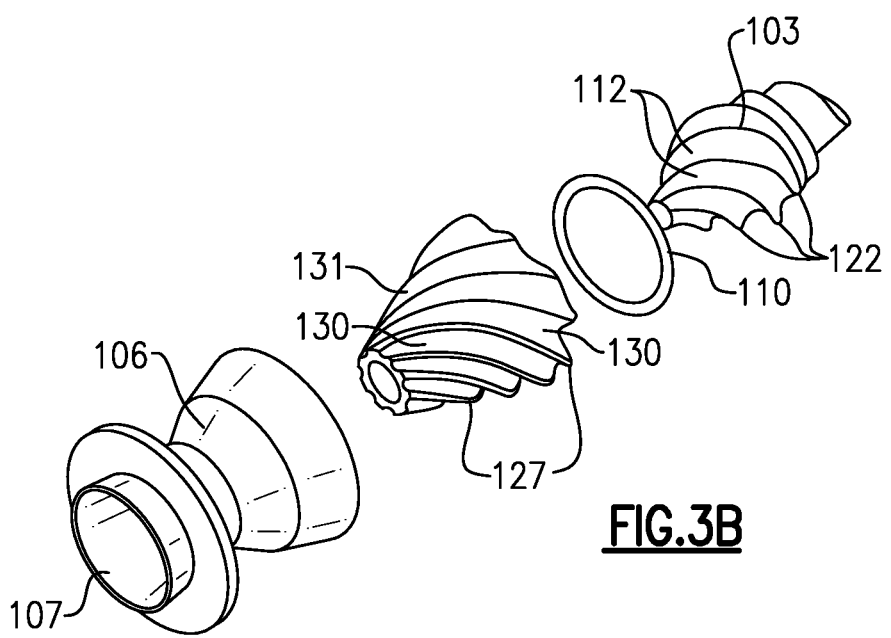
FIG. 3B is an exploded view of details from the FIG. 2A embodiment.

FIG. 3B is an exploded view showing the outer housing member 106 and the intermediate housing member 131. Again, there are a plurality of rails 127 on the intermediate housing member 131 defining the passages 130.

Similarly, the inner housing member 103 has a plurality of rails 122. Rails 122 define a plurality of passages 112. As can be seen, none of the passages 112 extend across the entire circumference of the inner housing member 103.

As can be appreciated as the inner surface 109 of outer housing 106, and the intermediate housing member 131 decrease in diameter from the upstream towards the downstream end a cross-sectional area of the outer passage 130 will also decrease causing an increase in fluid velocity. Thus, when the air (or in the optional embodiment injecting fuel at 133, air and fuel) leaves the outer passage 130 it is moving at a high velocity and with swirl.

Similarly, since the inner housing member 103 and intermediate housing member 131 also decrease in diameter the velocity of the mixed fuel and air will increase. Such that the fluids leaving mixing passages 112 at a high velocity and with swirl.

When the inner flow and the outer flow interact there is reliable mixing. Further combustion is moved downstream and the possibility of burn back toward fuel passages 101 is reduced.

In a featured embodiment, a combustor under this disclosure could be said to include a combustor lining 102 defining a combustion chamber 105 and a fuel and air mixing body 104 connected to the combustor liner to deliver mixed fuel and air into the combustion chamber 105. The mixing body 104 includes an inner housing member 103 centered on a center axis X and an intermediate housing member 131. A mixing passage 112 is defined between the inner 103 and intermediate 131 housing members. The mixing passage 112 extends along a direction from an upstream end to a downstream end with a circumferential component, a component in an axially downstream direction, and a radially inward component. At least one air inlet 118 extends into the mixing passage 112. A fuel supply 101 extends into the mixing passage 112 at a location downstream of the air inlet 118, and the mixing passage 112 extends downstream to supply fuel and air into the combustion chamber 105.

In another embodiment according to the previous embodiment, there is an outer housing member 106 defining an outer air passage 130 also extending along a direction with a component in a circumferential direction, a component in an axially downstream direction and a radially inward component. The outer air passage has a downstream end which is downstream of a downstream end of the mixing passage such that air leaves with a swirl downstream of the mixing passage to further provide mixing of the air and fuel from the mixing passage.

In another embodiment according to any of the previous embodiments, there are a plurality of the mixing passages and the outer air passages.

In another embodiment according to any of the previous embodiments, the inner housing member and the intermediate housing member each have a generally frusto-conical shape such that they decrease in diameter from the upstream end to the downstream end.

In another embodiment according to any of the previous embodiments, the outer housing member extends into a flared cone 107 extending radially outwardly at a location downstream of the downstream end of the outer air passage to communicate the mixed fuel and air into the combustion chamber.

In another embodiment according to any of the previous embodiments, the fuel supply includes fuel passages 122 that extend radially outwardly from the inner housing member into the mixing passage.

In another embodiment according to any of the previous embodiments, a fuel supply is connected to the fuel passages, the fuel supply being hydrogen.

In another embodiment according to any of the previous embodiments, a fuel inlet 133 extends into the outer air passage to mix fuel and air in the outer air passage.

In another embodiment according to any of the previous embodiments, the fuel supply includes fuel passages that extend radially outwardly from the inner housing member into the mixing passage.

In another embodiment according to any of the previous embodiments, a fuel supply is connected to the fuel passages, the fuel supply being hydrogen.

A gas turbine engine incorporating any of the above features is also disclosed and claimed.

An embodiment has been disclosed, however, a worker of skill in this art would recognize that modifications would come within the scope of this disclosure. For that reason, the following claims should be studied to determine the true scope and content.

What is claimed is:

1. A combustor comprising:
   a combustor liner defining a combustion chamber and a fuel and air mixing body connected to the combustor liner to deliver mixed fuel and air into the combustion chamber;
   the fuel and air mixing body including an inner housing member centered on a center axis and an A intermediate housing member, a mixing passage defined between the inner and intermediate housing members, and the mixing passage extending along a direction from an upstream end to a downstream end with a circumferential component, a component in an axially downstream direction, and a radially inward component with at least one air inlet into the mixing passage, rails extending from one of an outer surface of the inner housing member and an inner surface of the intermediate housing member to contact the other of the outer surface of the inner housing member and the inner surface of the intermediate housing member to define the mixing passage, and a fuel supply extending into the mixing passage at a location downstream of the air inlet, and the mixing passage extending downstream to supply fuel and air into the combustion chamber; wherein the fuel supply includes fuel passages that extend radially outwardly through the inner housing member and open at the outer surface of the inner housing member into said mixing passage between the inner and intermediate housing members.

2. The combustor as set forth in claim 1, wherein there is an outer housing member defining an outer air passage also extending along a direction with a component in a circumferential direction, a component in an axially downstream direction and a radially inward component and the outer air passage having a downstream end which is downstream of a downstream end of the mixing passage such that air leaves with a swirl downstream of the mixing passage to further provide mixing of the air and fuel from the mixing passage.

3. The combustor as set forth in claim 2, wherein there are a plurality of said mixing passages and said outer air passages.

4. The combustor as set forth in claim 2, wherein said inner housing member and said intermediate housing member each have a generally frusto-conical shape such that they decrease in diameter from the upstream end to the downstream end.

5. The combustor as set forth in claim 2, wherein the outer housing member extends into a flared cone extending radially outwardly at a location downstream of the downstream end of the outer air passage to communicate the mixed fuel and air into the combustion chamber.

6. The combustor as set forth in claim 5, wherein a hydrogen fuel source is connected to the fuel passages.

7. The combustor as set forth in claim 2, wherein a fuel inlet opens into the outer air passage to mix fuel and air in the outer air passage.

8. The combustor as set forth in claim 1, wherein a hydrogen fuel source is connected to the fuel passages.

9. A gas turbine engine comprising:
a compressor section and a turbine section with an intermediate combustor;
the combustor including a combustor liner defining a combustion chamber and a fuel and air mixing body connected to the combustor liner to deliver mixed fuel and air into the combustion chamber;
the fuel and air mixing body including an inner housing member centered on a center axis and an A intermediate housing member, mixing passage defined between the inner and intermediate housing members, and the mixing passage extending along a direction from an upstream end to a downstream end with a circumferential component, a component in an axially downstream direction, and a radially inward component with at least one air inlet into the mixing passage, rails extending from one of outer surface of the inner housing member and an inner surface of the intermediate housing member to contact the other of the outer surface of the inner housing member and the inner surface of the intermediate housing member to define the mixing passage, and a fuel supply extending into the mixing passage at a location downstream of the air inlet, and the mixing passage extending downstream to supply fuel and air into the combustion chamber; wherein
the fuel supply includes fuel passages that extend radially outwardly through the inner housing member and open at the outer surface of the inner housing member into said mixing passage between the inner and intermediate housing members.

10. The gas turbine engine as set forth in claim 9, wherein there is an outer housing member defining an outer air passage also extending along a direction with a component in a circumferential direction, a component in an axially downstream direction and a radially inward component and the outer air passage having a downstream end which is downstream of a downstream end of the mixing passage such that air leaves with a swirl downstream of the mixing passage to further provide mixing of the air and fuel from the mixing passage.

11. The gas turbine engine as set forth in claim 10, wherein there are a plurality of said mixing passages and said outer air passages.

12. The gas turbine engine as set forth in claim 10, wherein said inner housing member and said intermediate housing member each have a generally frusto-conical shape such that they decrease in diameter from the upstream end to the downstream end.

13. The gas turbine engine as set forth in claim 10, wherein the outer housing member extends into a flared cone extending radially outwardly at a location downstream of the downstream end of the outer air passage to communicate the mixed fuel and air into the combustion chamber.

14. The gas turbine engine as set forth in claim 13, wherein a hydrogen fuel source is connected to the fuel passages.

15. The gas turbine engine as set forth in claim 10, wherein a fuel inlet opens into the outer air passage to mix fuel and air in the outer air passage.

16. The gas turbine engine as set forth in claim 9, wherein a hydrogen fuel source is connected to the fuel passages.

* * * * *